United States Patent [19]

Gibson

[11] Patent Number: 4,549,528
[45] Date of Patent: Oct. 29, 1985

[54] METHOD AND APPARATUS FOR SOLAR DESTRUCTION OF TOXIC AND HAZARDOUS MATERIALS

[75] Inventor: George W. Gibson, Delray Beach, Fla.

[73] Assignee: Focus Environmental Systems, Ann Arbor, Mich.

[21] Appl. No.: 582,039

[22] Filed: Feb. 21, 1984

[51] Int. Cl.[4] .................................................. F24J 3/02
[52] U.S. Cl. .................................... 126/438; 126/452; 126/451; 110/246; 110/235
[58] Field of Search ............... 126/438, 439, 451, 452, 126/417, 440; 110/235, 345, 346, 236; 210/758, 748

[56] References Cited

U.S. PATENT DOCUMENTS

| | | | |
|---|---|---|---|
| 3,993,458 | 11/1976 | Antal, Jr. .......................... | 126/452 X |
| 3,998,205 | 12/1976 | Scragg et al. .................... | 126/452 X |
| 4,222,367 | 9/1980 | Jubb .................................. | 126/419 |
| 4,229,184 | 10/1980 | Gregg ............................... | 126/438 |
| 4,230,053 | 10/1980 | Deardorff et al. ................ | 110/346 |
| 4,232,614 | 11/1980 | Fitch et al. ....................... | 110/235 |
| 4,241,671 | 12/1980 | Joyner et al. ..................... | 110/235 X |
| 4,338,868 | 7/1982 | Lientz ................................ | 110/246 |

Primary Examiner—Larry Jones
Attorney, Agent, or Firm—Harness, Dickey & Pierce

[57] ABSTRACT

Toxic and hazardous organic materials are photochemically and thermally changed into innocuous and environmentally acceptable products through the proper application of solar energy. The present invention is especially well-suited for the destruction of polychlorinated biphenyls (PCB's) which are resistant to conventional incineration. The method and apparatus described herein are also capable of handling liquids, solids or vapors, with only minor operating modifications. In an enhanced alternative, the rate of oxidation is controlled through the entire transformation process, or portions thereof, to reduce energy needs in de-toxifying biological or chemical ordinance or the like.

40 Claims, 4 Drawing Figures

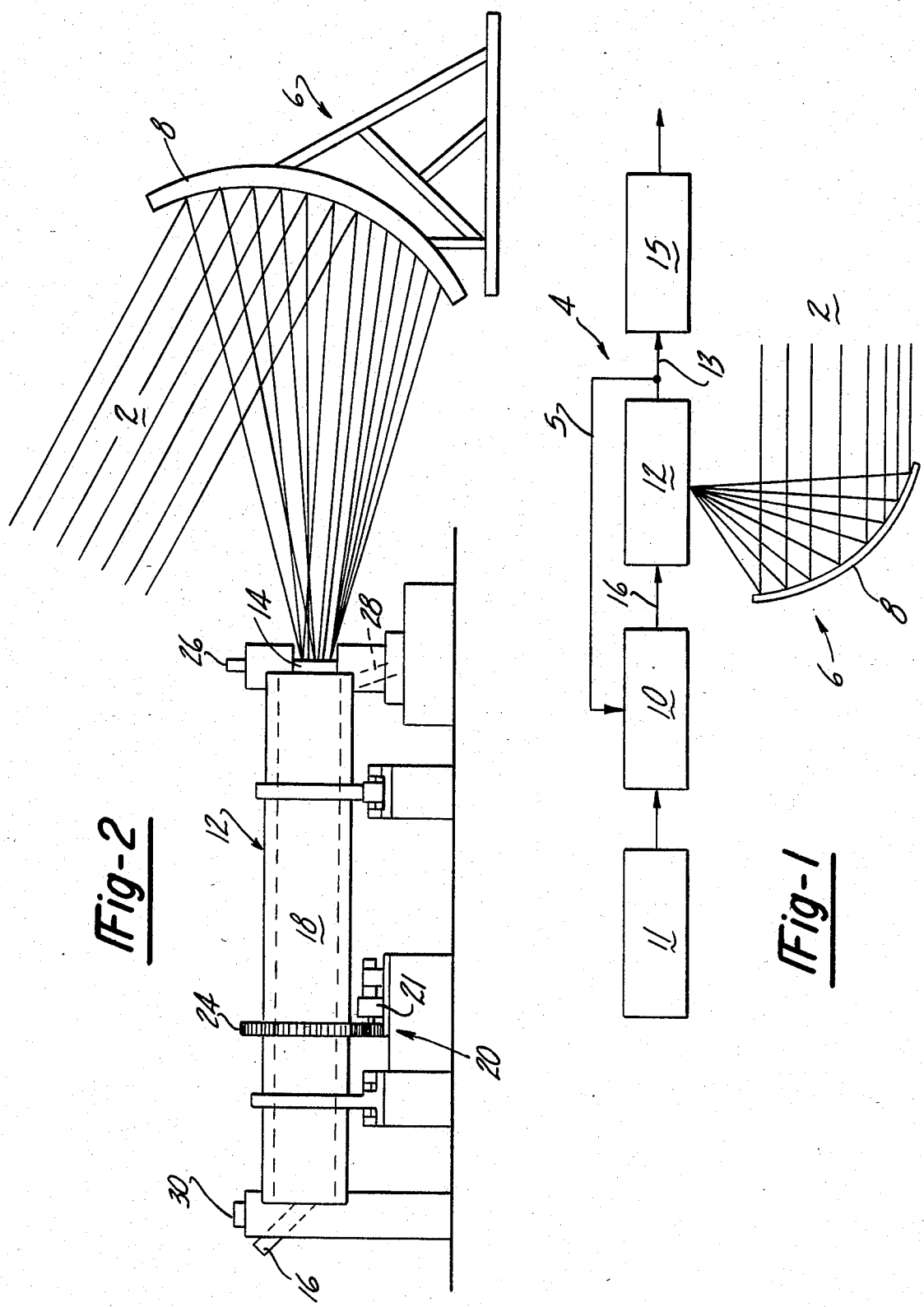

METHOD AND APPARATUS FOR SOLAR DESTRUCTION OF TOXIC AND HAZARDOUS MATERIALS

BACKGROUND AND SUMMARY OF THE INVENTION

In the great burst of technology since the 1940's, many hundreds of thousands of useful chemical compounds have been synthesized and produced by industry. Advances in the fields of analytical chemistry and medicine which followed have shown that many of these chemicals can have potential toxic and carcinogenic effects in man and that many of these are present and persistent throughout our environment. One class of chemicals which represent a particularly troublesome problem are those which are resistant or refractory to natural decomposition. Polychlorinated biphenyls (PCB's) are a notorious example of such compounds. These materials, particularly resistant to decomposition even under elevated temperature, were produced and widely used between 1929 and 1977 in many products. In pure or very concentrated form, PCB's were used as dielectric fluids in electric transformers and as such, are still in place. Congress banned further PCB production in 1977 after animal tests indicated that PCB's could cause cancer and other health problems. It has been estimated that 750 million pounds of PCB's alone are still in use or present in some form in the United States today, with many more times that level of other potentially harmful organic compounds.

Further, as war and the threat of war persisted, chemical agents and biologic munitions were developed, such as mustard gas and nerve gas agents, which are now desired to be destroyed. Many of these toxic materials are oxygen-rich or mixed with ordinance propellants or chemicals that create massive energy needs in order to contain the de-toxification process at practical temperatures.

In many cases due to a lack of adequate processes or equipment, the only acceptable "disposal" method for such chemicals and biologic agents was long-term storage or containment underground. This method is not an adequate ultimate disposal technique and has potential for adverse effects on both man and his environment.

Incineration is a potentially valuable method of disposal of toxic organic materials since it is possible in theory to oxidize the compounds to $CO_2$, $H_2O$, $SO_2$, $NO_2$, and other innocuous or easily handled materials. Operational problems, the use of fossil fuels, the necessity of high volumes of gas flow, and, perhaps most important, the resistance of some compounds (particularly PCB's) to oxidation under conventional operating conditions have limited the use of incineration as a disposal method.

Chemical reaction of toxic materials to render them harmless is a method of some value in detoxification. It has long been the method of choice for many inorganic materials, such as metals and cyanides, and has obvious potential for use in organic treatment. Chemical methods suffer, however, from high cost requirements for close control of processes and the potential for unexpected byproducts.

The present invention is characterized by a solar collector concentrating and focusing the sun's energy into a reaction vessel which is capable of containing the mixing solids, liquids, or gases and exposing these materials to the solar energy for a time sufficient to accomplish breakdown of chemical bonds. The hazardous and toxic wastes or the decomposition products can then be further reacted with, for example, oxygen, to complete the destruction process. Thus, a principal object of the present invention is to provide a method for destruction of hazardous and toxic materials through the application of concentrated solar energy.

A further object of this invention is to use the high intensity specific wavelength energy present in concentrated sunlight to break chemical bonds and accelerate decomposition of chemical compounds. The present invention also has the object using the intense thermal energy present in sunlight to obtain temperatures in excess of those created by combustion systems, which temperatures rapidly decompose chemical compounds. Still another object of this invention is to obtain these high temperatures but also minimize the requirement for air or other gaseous throughput so as to also minimize the large volumes of exit gas common to combustion systems. The present invention also has the object of providing the above objects in the treatment of solid, liquid or gaseous materials.

Photochemical degradation appears to be a primary pathway for natural environmental renewal. Specific wavelength energy can be absorbed by certain chemical bonds to break these bonds. For a given compound, the change in concentration of the organic material over time has been found to be directly proportional to the original concentration, so that a rate constant can be determined to provide an equation. That rate constant has been found to be directly proportional to the intensity of the sunlight applied to the concentration of organic material. Therefore, the rate of destruction of the compound is proportional to the intensity of the sunlight.

The present invention provides means for contacting a compound such as an organic material with sunlight which is concentrated many thousands of times.

The chemical reaction for destruction of an organic compound may be accelerated by addition of heat. Specifically, the rate constant for a chemical reaction increases in an exponential manner with temperature. For many common reactions, the effect of this relationship is that reaction rates can be double or triple with a temperature increase of 10 degrees Centigrade.

The present invention provides means for heating the reaction vessel containing a compound such as an organic material and permits doing so without an external combustion process or other man-made energy source which may add materials which in turn would have to be safely exhausted. The present invention may, as an alternative, be used to supplement a man-made energy source.

The process of the present invention employs the entire frequency range of radiation from the sun (IRR-UVR). By utilizing the full range of frequencies for energy transfer, the combined photochemical and thermal decomposition of toxic materials is thought to occur at lower temperatures than those developed through thermal transformation alone.

A further object of the present invention is the further enhancement of the basic process by controlling the rate of oxidation throughout the entire transformation process, including such control during the preparation of the toxic material, the presentation of the toxic material for solar de-toxification, and the effluent. Such an enhancement can provide a relatively inexpensive de-toxification process and apparatus since the process or apparatus can operate effectively at lower temperatures and not need as much coolant as required by a process or apparatus requiring the higher temperature for de-toxification.

Other objects and advantages of the instant invention will be apparent in the following specification, claims and drawings.

BRIEF DESCRIPTION OF THE DRAWINGS

FIG. 1 is a schematic view of a complete system for destruction of toxic and hazardous wastes as included in the present invention;

FIG. 2 is an elevated view of a reactor apparatus of the present invention;

DETAILED DESCRIPTION OF THE PREFERRED EMBODIMENTS

Figure 3:
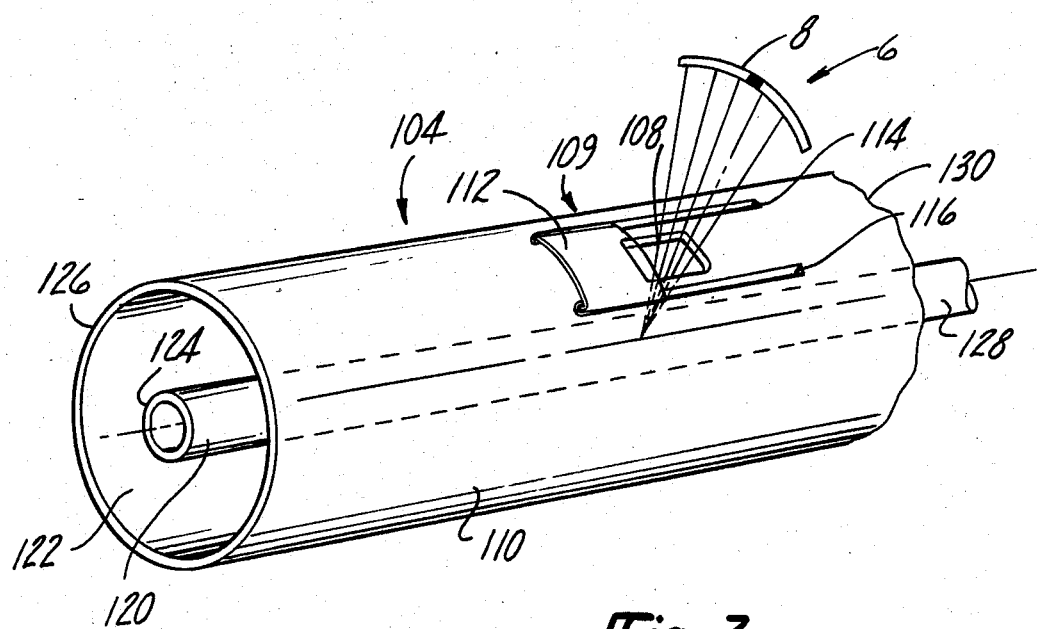
FIG. 3 is an elevated perspective view of an alternative reactor apparatus of the present invention.

FIG. 1 illustrates a complete system 4 in which a portion of the exhaust gas from a solar reactor 12 is conducted via a conduit 5 to preheat the incoming material via a preheat mechanism 10 illustrated schematically. The preheat mechanism 10 would be located in a position before a feed port 16 of the reactor 12, with a feed mechanism 11 disposing hazardous or toxic materials into the preheat mechanism 10. The feed mechanism 11 may also provide the function of collection and concentration of hazardous or toxic materials prior to feeding the materials to the preheat mechanism 10. The remaining portion of the exhaust gas and/or ash is conveyed to treatment facilities 15 by conduit 13 where conventional vapor/solid phase treatment technology is employed to prevent possible contamination of the environment by particulate or residual compounds, releasing safe byproducts indirectly or directly to the environment and returning toxic or hazardous byproducts to a storage area and/or to the feed mechanism 11 or to an additional process.

Solar radiation in the form of sun rays 2 is collected, reflected and focused by a solar concentrator 6, consisting of at least one curved mirror 8 and a suitable tracking system necessary for effective operation. As illustrated, collected solar radiation is focused to a specific working point or area in the reactor 12. The reactor 12, however, can be mounted at the focal points of a single concentrator or may be used with a field of heliostats and several curved mirrors 8. The reactor 12 may be one reactor vessel or a series of reactor vessels, as desired, with an individual focal working point in each vessel. Each vessel may also have its own solar concentrator 6 or a solar concentrator 6 may be adjusted to focus seriatim on individual vessels.

As an alternative embodiment of the present invention, exit gas from the solar reactor 12 can be used to vaporize organic material from the sample to be treated. Vapors are then conducted to the solar reactor 12 where they are contacted with the concentrated solar energy and reacted to produce innocuous products.

The raw material for this process may be in the form of a solid, liquid or gas. Solids and liquids will require some pretreatment for volatilization, while gases may be fed directly into the solar reactor 12. Solids and liquids may be pure or may contain only a small amount of the contaminant to be reacted. Further, the process may be used to treat materials collected previously such as, for example, those materials absorbed on activated carbon which can be removed by heat from the activated carbon.

Referring to FIG. 2, an apparatus is illustrated that can be employed as the solar reactor 12 of the system 4 for solar destruction of toxic and hazardous wastes. Collected solar radiation is focused to a specific working point or area in the solar reactor 12 through access means comprising a suitable window 14. The material of which the window 14 is constructed is such that the material will not filter out the specific wavelength radiation necessary for the desired photochemical reactions. One such material for the window 14 is quartz. Other materials can be used based on specific radiation energy desired in the reactor 12. The window 14 is also constructed so that the window 14 may be changed to a window of a different material in order to vary the wavelengths filtered by the window 14 as desired for different compounds of pollutants or toxic materials.

The reactor 12 may be a type of rotating kiln as shown or other device embodying similar features capable of feeding the materials to a point at which focused solar energy may act upon the materials. Solids, liquids or vapor feed material is fed to the reactor 12 at the feed port 16 to enter an insulated working chamber 18 which may contain flights or blades to provide mixing of the feed material, and may be aided by a gravity feed by means of a slight angulation of the reactor 12. In the illustrated embodiment, rotation of the reactor 12 is provided by a drive mechanism 20, including a motor 21, drive pinion 22 and ring gear 24. Feed material proceeds the length of the reactor 12 toward and through the source of the concentrated solar radiation prior to exiting the reactor 12 at the exhausting means for the effluents and byproducts, discharged as a vapor at vapor discharge port 26 or an ash or other solid at the lower gravity discharge port 28. If desired, reaction gas may be added to the reactor 12 through port 30 to facilitate the waste destruction process, the residual of which reaction gas will also be exhausted at discharge port 26.

Figure 4:
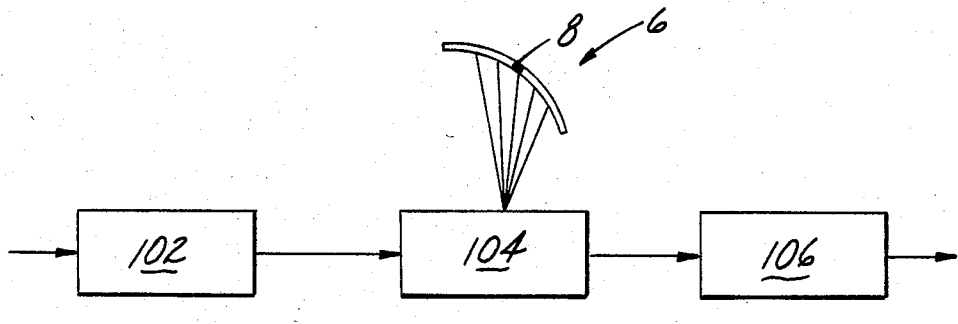
FIG. 4 is a schematic diagram of an enhanced alternative process of the present invention.

Referring to FIGS. 3 and 4, further enhancement of the basic process is illustrated by controlling the rate of oxidation throughout the entire transformation process including preparation of the toxic material 102, the presentation of the toxic material for solar de-toxification in a reactor 104, and the effluent 106. The toxic material and/or the container for the toxic material is scrubbed and encapsulated in an inert or oxygen controlling medium as part of the preparation of the toxic material for presentation to the solar de-toxification stage of the process. The toxic material may also be intermixed with the inert gas.

The preparation phase apparatus 102 may be a liquid organic scrubber that remains in fluid solution to the transformation phase. The organic scrubber solution may be further enhanced by mixing it with oxygen absorbers or encapsulating it in an inert atmosphere.

The rate of oxidation also can be controlled in the transformation phase of the process in the reactor 104 by utilizing a series of mechanical leaks or windows of transformation 108, as shown by FIG. 3, along the length of an elongated reactor such as the cylindrical pipe 110 illustrated. The windows 108 may be open directly to the impingement of solar flux or may include a control 109 of various materials used to control the profile of the energy transfer, such as a translucent or filter type of light transmitting glass or any type of glass that filters or controls light influx. An example of one such a control 109 would be a filter 112 mechanically moveable along tracks 114 and 116 disposed on the outer surface of the pipe 110 to control the impingement of concentrated solar radiation through the window 108, such as is indicated from the solar concentration 6. These windows 108 and controls 109 would be used to control the process temperature including the temperature of the mechanical structure housing the process, such as the pipe 110, and the adjacent environment.

The toxic material will travel in a translucent or transparent capsule which capsule is transported through the pipe or may be transported, as shown in FIG. 3, through a translucent or transparent pipe 120. In the chamber 122 between the inner pipe 120 and the outer pipe 110 is disposed the oxygen controlling medium, such as an inert gas or an oxygen absorption medium. The input ends 124 and 126 of the inner 120 and outer 110 pipes, respectively, are operably associated with a mechanism comprising the preparation phase apparatus 102, such as a liquid scrubber. The output ends 128 and 130 are likewise operably associated with an effluent apparatus 106, which may be similar to the apparatus 104 without the window 108 or the control 109.

Similarly, the effluent apparatus 106 may also be controlled by an inert or oxygen-controlling encapsulation or environment, such as one pipe within another defining two passageways, in order to improve the durability or practicality of the mechanical housing.

While the above description constitutes the preferred embodiments of the present invention, it will be appreciated that the invention is susceptible to modification, variation and change without departing from the proper scope or fair meaning of the accompanying claims.

I claim:

1. An apparatus for the destruction of toxic and hazardous materials having specific chemical bonding energies, comprising:
   a reactor comprising a reaction chamber and defining a reaction zone within said reaction chamber;
   a transparent window set in one surface of said reactor, said window being transparent to solar radiation at the wave lengths corresponding to the bonding energies of said materials;
   means for collecting solar radiation, directing solar radiation into said reaction chamber through said transparent window, concentrating said solar radiation to within said reaction zone, and focusing solar energy in said reaction zone;
   means for feeding toxic and hazardous materials into said reaction chamber of said reactor at said reaction zone;
   means for controlling the rate of oxidation of said materials within said reaction chamber; and
   means for withdrawing byproducts of said toxic and hazardous materials from said reaction chamber;
   wherein the high intensity specific wave length energy present in said concentrated sunlight breaks chemical bonds in said toxic and hazardous materials and accelerates decomposition of the chemical compounds of said toxic and hazardous materials, degrading said compounds in direct proportion to the original concentration of the compounds.

2. An apparatus in accordance with claim 1, wherein said window is composed of a quartz material.

3. An apparatus in accordance with claim 1, further comprising a rotating reactor which includes said reaction chamber and has said solar radiation collecting means disposed substantially at one end of said reactor and said feeding means disposed substantially at the opposite end of said reactor.

4. An apparatus in accordance with claim 1, further comprising a rotating reactor rotating about an axis, which has said feeding means disposed substantially at one axial end of said reactor and said withdrawing means disposed substantially at the other axial end of said reactor.

5. An apparatus in accordance with claim 1, wherein said withdrawing means includes monitoring means for determining whether said byproducts are safe or hazardous, means for returning hazardous byproducts to said feeding means, and means for exhausting safe byproducts to the environment.

6. An apparatus in accordance with claim 1, further comprising means for preheating said hazardous or toxic materials disposed between said feeding means and said reaction chamber for conducting exhausted materials through said preheating means wherein the residual heat from said exhausted materials is used to preheat hazardous or toxic materials fed into said reaction chamber.

7. An apparatus in accordance with claim 1, further comprising means for controlling the rate of oxidation in said withdrawing means.

8. An apparatus in accordance with claim 1, further comprising means for preparing said toxic and hazardous materials for presentation to said reaction chamber by said feeding means including means for controlling the rate of oxidation in said preparing means.

9. An apparatus for the destruction of toxic and hazardous materials having specific chemical bonding energies, comprising:
   a reactor comprising a reaction chamber and defining a reaction zone within said reaction chamber;
   means for feeding said materials to said reaction zone of said reaction chamber;
   means for collecting and directing solar radiation into said reaction chamber and concentrating said solar radiation within said reaction zone so that the high intensity specific wave length energy present in said concentrated solar radiation facilitates breakage of the chemical bonds in said materials and accelerates decomposition of the chemical compounds of said materials;
   means for controlling the rate of oxidation of said materials in the vicinity of said reaction zone within said reaction chamber; and
   means for withdrawing byproducts of said materials from said reaction chamber.

10. An apparatus in accordance with claim 9 wherein said means for controlling the rate of oxidation comprises an oxygen absorbing medium disposed within said reaction chamber.

11. An apparatus in accordance with claim 9 wherein said means for controlling the rate of oxidation comprises an inert gas within said reaction chamber.

12. An apparatus in accordance with claim 9 further comprising a container within said reaction chamber and within which said materials are retained at said reaction zone and which is adapted to allow concentrated solar radiation to pass therethrough and to said materials.

13. An apparatus in accordance with claim 12 wherein said container is a translucent capsule.

14. An apparatus in accordance with claim 12 wherein said container is a transparent capsule.

15. An apparatus is accordance with claim 12 wherein said container comprises a through conduit extending within said reaction chamber and which defines an input end which operably communicates with said feeding means and an output end which operably communicates with said withdrawing means.

16. An apparatus in accordance with claim 15 wherein said conduit is a translucent pipe.

17. An apparatus in accordance with claim 15 wherein said conduit is a transparent pipe.

18. An apparatus in accordance with claim 15 wherein said withdrawing means comprises an outer housing, an inner housing operative to communicate with said output end of said conduit, and an oxygen controlling medium disposed within said outer housing and which creates an oxygen controlled environment between said outer housing and said inner housing.

19. An apparatus in accordance with claim 12 wherein said means for controlling the rate of oxidation comprises an oxygen controlling medium disposed within said reaction chamber which is operative to create an oxygen controlled environment surrounding said container and in the vicinity of said reaction zone.

20. An apparatus in accordance with claim 9 wherein said feeding means includes preparation means for organically scrubbing and isolating said materials in an oxygen controlled environment.

21. An apparatus in accordance with claim 9 wherein said reactor further comprises an elongated outer housing within which said reaction chamber is disposed, said outer housing including a window through which said concentrated solar radiation is passed into said reaction chamber and which is transparent to solar radiation at the wave lengths corresponding to the bonding energies of said materials, and a series of spaced adjustable access openings for adjustably controlling the reaction temperature within said reaction chamber.

22. In a system including a working chamber, a method for destruction of toxic and hazardous materials, comprising:
feeding said materials into a working chamber;
collecting and filtering solar energy and focusing said filtered solar energy into said working chamber to directly act upon said materials in said working chamber;
controlling the rate of oxidation within said working chamber; and
exhausting the byproducts of said materials out of said working chamber while minimizing any need for any large volumes of gaseous throughput through said working chamber.

23. A method in accordance with claim 22, further comprising the step of preheating said materials prior to feeding said materials into said working chamber.

24. A method in accordance with claim 22, further comprising the steps of monitoring said byproducts as the byproducts are exhausted from said working chamber, releasing the safe byproducts from the system and directing toxic or hazardous byproducts to a safe storage area.

25. A method in accordance with claim 22, further comprising the step of preparing the materials prior to feeding the materials into a working chamber including the step of controlling the rate of oxidation during said preparing step.

26. A method in accordance with claim 25 wherein the step of controlling the rate of oxidation during said preparing step comprises organically scrubbing and encapsulating said materials in an inert medium prior to feeding said materials into said working chamber.

27. A method in accordance with claim 25 wherein the step of controlling the rate of oxidation during said preparing step includes encapsulating said materials in an oxygen controlling medium.

28. A method in accordance with claim 25 wherein the step of controlling the rate of oxidation during said preparing step includes intermixing said materials with an inert gas.

29. A method in accordance with claim 25 wherein the step of preparing said materials prior to feeding said materials into said working chamber further includes subjecting said materials to an organic scrubber solution.

30. A method in accordance with claim 29 wherein the step of controlling the oxidation during said preparing step includes the step of mixing said organic scrubber solution with oxygen absorbing materials.

31. A method in accordance with claim 29 wherein the step of controlling the rate of oxidation during said preparing step includes encapsulating said organic scrubber solution in an inert atmosphere.

32. A method in accordance with claim 22, further comprising the step of controlling the rate of oxidation during said exhausting step.

33. A method in accordance with claim 32 wherein the step of controlling the rate of oxidation during said exhausting step comprises subjecting said byproducts of said materials to an oxygen controlled environment.

34. A method in accordance with claim 33 wherein said oxygen controlled environment includes an oxygen absorbing medium.

35. A method in accordance with claim 33 wherein said oxygen controlled environment includes an inert gas.

36. A method in accordance with claim 33 wherein said byproducts of said materials are encapsulated within said oxygen controlled environment during said exhausting step.

37. A method in accordance with claim 22 wherein the step of controlling the rate of oxidation within said working chamber is effected by adjustably controlling the influx into said working chamber of said collected and focused solar energy.

38. A method in accordance with claim 2 wherein the step of controlling the rate of oxidation within said working chamber comprises isolating said materials within a transparent or translucent container disposed within said working chamber.

39. A method in accordance with claim 22 wherein the step of controlling the rate of oxidation within said working chamber includes locating an oxygen absorbing medium within said working chamber.

40. A method in accordance with claim 22 wherein the step of controlling the rate of oxidation within said working chamber includes at least partially filling said working chamber with an inert gas.

* * * * *